Nov. 25, 1958  O. KREIDLER  2,861,461
ADJUSTABLE TRANSMISSION
Filed May 28, 1957  4 Sheets-Sheet 1

Inventor:
Otto Kreidler
by Michael S. Striker
agt.

Nov. 25, 1958     O. KREIDLER     2,861,461

ADJUSTABLE TRANSMISSION

Filed May 28, 1957     4 Sheets-Sheet 2

Inventor:
Otto Kreidler
by:
Michael S. Striker
agt.

Nov. 25, 1958    O. KREIDLER    2,861,461
ADJUSTABLE TRANSMISSION

Filed May 28, 1957    4 Sheets-Sheet 3

Inventor:
Otto Kreidler
by:
Michael S. Striker
agt.

United States Patent Office 2,861,461
Patented Nov. 25, 1958

2,861,461

ADJUSTABLE TRANSMISSION

Otto Kreidler, Stuttgart, Germany, assignor to Firma Getrag Getriebe- und Zahnradfabrik G. m. b. H., Ludwigsburg, Wurttemberg, Germany Application May 28, 1957, Serial No. 662,243

Claims priority, application Germany May 28, 1956

9 Claims. (Cl. 74—371)

The present invention relates to adjustable transmissions.

More particularly, the present invention relates to that type of transmission where a rotatable shaft has on it a plurality of drive elements such as gears or the like and where anyone of the drive elements may selectively be placed in driving engagement with the shaft by a suitable means such as motion transmitting elements located in openings of the shaft and movable radially away from the axis of the shaft into recesses of the drive elements to place a selected drive element in driving engagement with the shaft.

With constructions of this type the motion transmitting elements may take the form of ball members which are radially movable in openings of a hollow drive shaft, and where the parts of the transmission are required to rotate at high speeds a considerable centrifugal force is developed at these ball members so that it is necessary to keep them at a relatively small size in order to prevent undesirably large centrifugal forces from developing during operation of the transmission. However, this small size of the motion transmitting element is a serious disadvantage because it limits the force which can be transmitted through the motion transmitting elements.

Moreover, during operation of a transmission of the above type the ball elements associated with a drive element which is not in driving engagement with the drive shaft move outwardly away from the axis of the drive shaft as a result of centrifugal force and bear against the periphery of the non-engaged drive element so as to create a considerable amount of noise and wear of the parts.

With a conventional transmission of the above type the drive element such as a gear or the like has the recesses at its inner annular surface of as small a size as possible in a circumferential direction so that the motion transmitting elements such as the ball members or the like just fit into these recesses when the drive element is in driving engagement with the drive shaft. This is done so that the ball elements or the like will have as little opportunity as possible to move into the recesses under centrifugal force when it is not desired to place the driving element in engagement with the drive shaft. However, this construction has serious disadvantages in that when it is desired to place the ball elements or the like in the recesses of the drive element in order to connect the latter with the drive shaft there is but a small likelihood that the recesses of the drive element will be in alignment with the ball elements at the exact instant when the latter are moved radially away from the axis of the shaft toward the recesses. Thus, when such movement takes place the ball elements press against the inner surface of the drive element and a considerable amount of stress and noise is created until the drive element and drive shaft are capable of turning one with respect to the other through the angular distance required to place the ball elements and recesses in circumferential alignment with each other.

One of the objects of the present invention is to provide an adjustable transmission of the above type wherein the ball elements or other motion transmitting elements may be made as large as desired without any danger of undesirable results flowing from the centrifugal force developed at the motion transmitting elements during rotation thereof.

Another object of the present invention is to provide a transmission of the above type which will operate with very little noise and with very little wear of the parts.

A further object of the present invention is to provide an adjustable transmission of the above type wherein the recesses of a drive element which receive the motion transmitting elements such as ball members or the like are of considerable length in a circumferential direction so that the possibility of the motion transmitting elements having no recesses to go into at the particular instant when the motion transmitting elements are moved radially away from the axis of the drive shaft is very slight.

An additional object of the present invention is to provide an adjustable transmission wherein the motion transmitting elements are prevented from moving radially away from the axis of the drive shaft under the influence of centrifugal force except when it is desired to move the motion transmitting elements in this manner in order to place a drive element in driving engagement with the drive shaft.

It is also an object of the present invention to provide a structure capable of accomplishing all of the above objects and at the same time composed of simple and ruggedly constructed elements which are very reliable in operation.

With the above objects in view, the present invention mainly consists of an adjustable transmission which includes an elongated hollow shaft which is rotatable about its axis and which is formed in each of a pair of axially spaced planes which are normal to the axis of the shaft with a plurality of openings distributed about the axis of the shaft. A pair of drive elements are freely turnable on the shaft and are respectively located in these planes, and these drive elements are formed at their inner surfaces which are directed toward the shaft respectively with a plurality of recesses which are respectively aligned with the openings of the shaft when the drive elements and shaft are in predetermined angular positions with respect to each other. A plurality of motion transmitting elements are respectively located in the openings of the shaft so as to form two sets of motion transmitting elements respectively located in the two planes, and an engaging means is axially shiftable along the interior of the hollow shaft for engaging one or the other of the sets of motion transmitting elements for moving a selected set of motion transmitting elements radially away from the axis of the shaft into the recesses of one of the drive elements for placing the latter drive element in driving engagement with the shaft. At the outer surface of the shaft between the above-mentioned two planes there is located a means which is axially shiftable along the shaft and which has a neutral position partly overlapping the two sets of motion transmitting elements for maintaining the latter inwardly away from their outer operating positions. When the engaging means is shifted so as to place one of the sets of motion transmitting members in its operating position, this latter set of motion transmitting members shifts the means shiftable along the exterior of the shaft toward the other set of motion transmitting members so as to overlap the latter to a greater extent and so as to maintain the latter set of motion transmitting members positively in a non-operating position where they cannot move outwardly away from the axis of the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
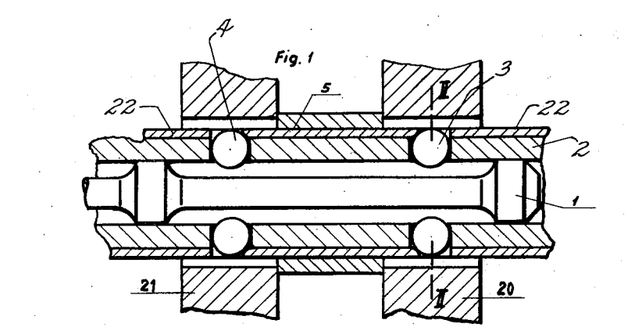
Fig. 1 is a fragmentary longitudinal sectional elevational view of one possible construction of an adjustable transmission according to the present invention.

Referring now to Fig. 1 of the drawings, the transmission illustrated therein includes an elongated hollow shaft 2 which is rotatable about its axis and which is formed in each of a pair of planes axially spaced from each other and normal to the axis of the shaft 2 with a plurality of openings distributed about the axis of the shaft. A plurality of motion transmitting members in the form of ball members 3 are respectively located in the openings in one of the planes for radial movement with respect to the axis of the shaft 2, and a second set of ball members 4 are respectively located in the openings in the other of the planes also for free radial movement with respect to the axis of the shaft 2.

A pair of drive elements 20 and 21 in the form of gears or the like are respectively freely turnable on the shaft 2 and are respectively located in the planes where the openings of the shaft 2 are located, and each of these drive elements is formed at its inner surface which is directed toward the shaft 2 with a plurality of recesses described in greater detail below in connection with Figs. 8 and 9 and adapted to respectively receive the ball members 3 or 4 when a selected one of the drive elements is to be placed in driving engagement with the shaft 2.

An engaging means is provided for placing a selected set of ball elements in the recesses of one of the drive elements 20 or 21 so as to connect the selected drive elements in driving engagement with the shaft 2, and this engaging means is in the form of an elongated bar 1 coaxial with the shaft 2 and located in the latter, this bar having one or more outwardly extending annular portions slidably engaging the inner surface of the shaft 2, as is clearly indicated in Fig. 1. In the embodiment of Fig. 1 the bar 1 has a pair of such annular portions, and when this bar 1 is shifted to the left, as viewed in Fig. 1, the right annular portion will engage the ball members 3 in order to move the latter outwardly to their operating position where they place the gear or the like 20 in driving engagement with the shaft 2, while when the bar 1 is shifted to the right, as viewed in Fig. 1, the left annular portion shown in Fig. 1 will engage the ball members 4 so as to move the latter outwardly from the axis of the shaft 2 into an operating position where they are respectively located in the recesses of the element 21 so as to place the latter in driving engagement with the shaft 2. During operation of the transmission when the shaft 2 rotates about its axis the motion transmitting elements 3 and 4 are urged outwardly away from the axis of the shaft 2 by centrifugal force.

In accordance with the present invention a means is located on the outer surface of the shaft 2 between the two planes in which the openings thereof are located and freely shiftable on the shaft 2, this means which is axially shiftable on the shaft 2 at the exterior thereof having a pair of ends respectively partly overlapping the sets of ball members 3 and 4 so as to maintain the latter inwardly away from their outer operating positions, and in this way the ball members are prevented from pressing against the drive elements 20 or 21 when it is not desired to connect them with the shaft 2 for rotation therewith. This means shiftable axially along the exterior of the shaft 2 is shown in the embodiment of Fig. 1 in the form of an elongated hollow sleeve 5 freely turnable on the shaft 1 at the exterior surface thereof and located between the two planes where the ball elements 3 and 4 are located. As is evident from Fig. 1, the free ends of the elongated tubular sleeve 5 partly overlap the ball members 3 and 4 in the neutral position of the sleeve 5 shown in Fig. 1, so that the free ends of the latter sleeve prevent the ball members 3 and 4 from moving radially away from the axis of the shaft 2 due to centrifugal force, and thus when the sleeve 5 is in its neutral position shown in Fig. 1 the ball members 3 and 4 cannot press against the inner surface of the gears or the like 20 and 21 and do not create any undesirable noise or wear of the parts.

Figure 2:
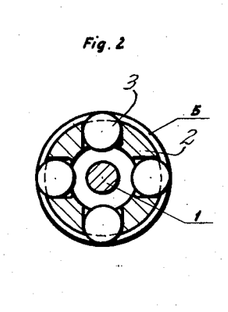
Fig. 2 is a transverse view taken along line II—II of Fig. 1.

The sleeve 5 is preferably made of a bearing material and serves additionally to support at least part of the gears or the like 20 and 21 on the shaft 2 for free rotation thereon except when placed in driving engagement therewith. As may be seen from Fig. 2, when the sleeve 5 is in its neutral position the outermost portions of the ball members 3 or 4 are located at the same distance from the axis of the shaft 2 as the outer surface of the sleeve 5. Moreover, as is evident from Fig. 1, the sleeve 5 has its end faces curved in the manner shown in Fig. 1, so that the sleeve 5 is capable of easily shifting axially into a position overlapping one or the other sets of ball members 3 and 4 to a greater extent, and moreover these ball members are also capable of shifting the sleeve 5 automatically due to the centrifugal force of the ball members. With the structure of Fig. 1 the number and size of the ball members 3 is equal to the number and size of the ball members 4 so that due to the centrifugal force the two sets of ball members provide equal and opposite forces at the ends of the sleeve 5 so as to automatically maintain the latter in the neutral position shown in Fig. 1 where neither of the elements 20 and 21 is in driving engagement with the shaft 2.

Figure 3:
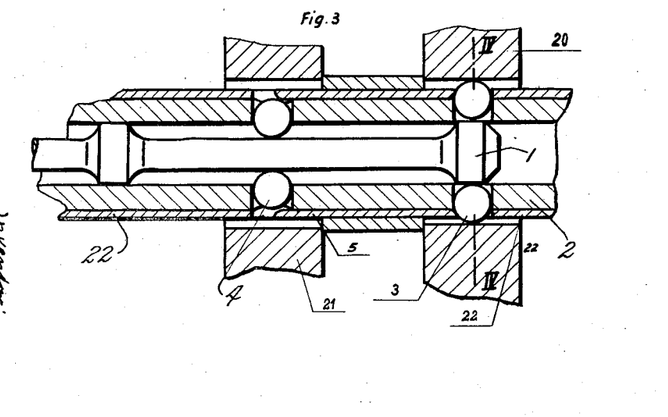
Fig. 3 is a longitudinal sectional elevational view showing the structure of Fig. 1 in a position different from that shown in Fig. 1.
Figure 4:
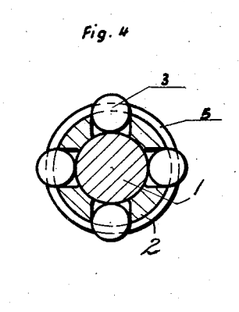
Fig. 4 is a transverse sectional elevation view taken along line IV—IV of Fig. 3.

Assuming that it is desired, for example, to place the gear 20 in driving engagement with the shaft 2, then the engaging means 1 is shifted to the left from the position of Fig. 1 to that of Fig. 3, and this will cause the ball members 3 to be moved radially away from the axis of the shaft 2 into the recesses of the gear 20 so as to place the latter in driving engagement with the shaft 2. As the ball members 3 move radially away from the axis of the shaft 2, they shift the sleeve 5 to the left, as viewed in Figs. 1 and 3, and as a result the sleeve 5 with its left end, as viewed in Figs. 1 and 3, overlaps the ball members 4 to a greater extent and shifts these ball members 4 inwardly toward the axis of the shaft 2, so that with the parts in the position of Fig. 3 the ball members 4 are maintained away from the gear or the like 21 and cannot produce any undesirable wear or noise. Of course, the bar 1 can also be shifted to the right to move the ball members 4 outwardly to their operating position, and in this case the outward movement of the ball members 4 causes the sleeve 5 to be shifted to the right, as viewed in Fig. 1, so that the right end of the sleeve 5 now moves the ball members 3 radially inwardly toward the axis of the shaft 2 so as to maintain these ball members 3 away from the element 20 while the element 21 is in driving engagement with the shaft 2. Fig. 4 shows the extent to which the ball members 3 (or the ball members 4) project radially outwardly beyond the sleeve 5 when the ball members are in their operating position placing the element 20 in driving engagement with the shaft 2.

When the shaft or engaging means 1 is shifted back from the position of Fig. 3 to that of Fig. 1, the centrifugal force of the ball members 4 on the end of the sleeve 5 is no longer resisted, and thus these ball members 4 move radially outwardly and automatically shift the sleeve 5 back to the position of Fig. 1, the sleeve 5 now automatically moving the ball members 3 back to their position shown in Fig. 1. Thus, the return of the parts to their neutral position is brought about automatically after the bar 1 is shifted to its neutral position.

Additional sleeves 22 of the same material as the sleeve 5 may be located on the shaft 2 at the sides of the motion transmitting elements 3 and 4 opposite from the sleeve 5 to serve also to support the gears 20 and 21 for rotation about their axis.

When three or more sets of ball members are used instead of two as shown in Figs. 1 and 3, then a means 5 axially shiftable at the exterior of the shaft 2 is located between each pair of ball member sets.

Figure 5:
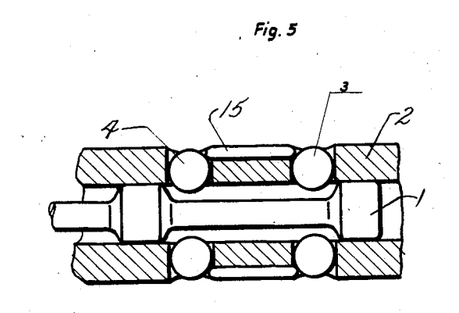
Fig. 5 is a longitudinal sectional elevational view of another embodiment of an adjustable transmission according to the present invention.
Figures 6, 7:
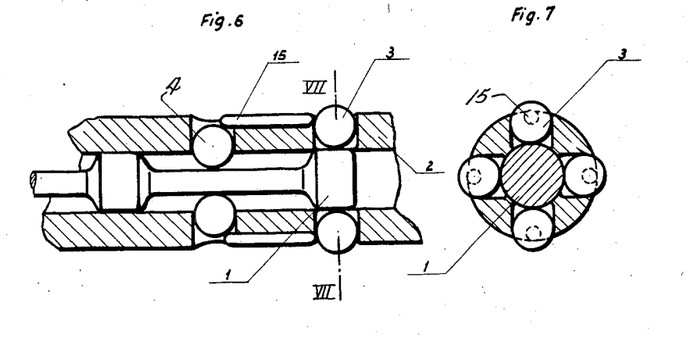
Fig. 6 shows the structure of Fig. 5 in a position different from that of Fig. 5.
Fig. 7 is a transverse sectional view taken along line VII—VII of Fig. 6.

The means which is axially shiftable along the outer surface of the shaft 2 for maintaining the non-operating set of motion transmitting elements inwardly away from a drive element, instead of taking the form of a sleeve 5 as described above, may take the form of a plurality of elongated pins 15 (Figs. 5 and 6) which are respectively located in axial grooves formed at the exterior of the shaft 2 and respectively aligned with the openings thereof. These pins 15 are made of a suitable metal and produce the same results as the sleeve 5 described above. The ends of each pin 15 partly overlap the ball members 3 and 4, as indicated in Fig. 5, when the pins 15 are in their neutral position, and these pins are shifted in the same way as the sleeve 5 when one of the sets of ball members is moved radially outward to its operating position in order to move the other set of ball members inwardly towards the axis of the shaft 2, as may be seen from a comparison of Figs. 5 and 6 where the bar 1 has been shifted from the position of Fig. 5 to that of Fig. 6 to locate the ball members 3 in their operating position so that the pins 15 locate the ball members 4 inwardly away from their operating position. The ends of the pins 15 are rounded, and these pins are themselves of circular cross section, as is particularly evident from Fig. 7 which shows the circumferential relationship between the elements of the structure of Figs. 5 and 6.

The pins 15 serve as reliably as the sleeve 5 to prevent outward movement of the motion transmitting elements under the action of centrifugal force, and at the same time as compared with the sleeve 5 the pins 15 are of a certain advantage in that they may be axially shifted easier than the sleeve 5.

Figure 8:
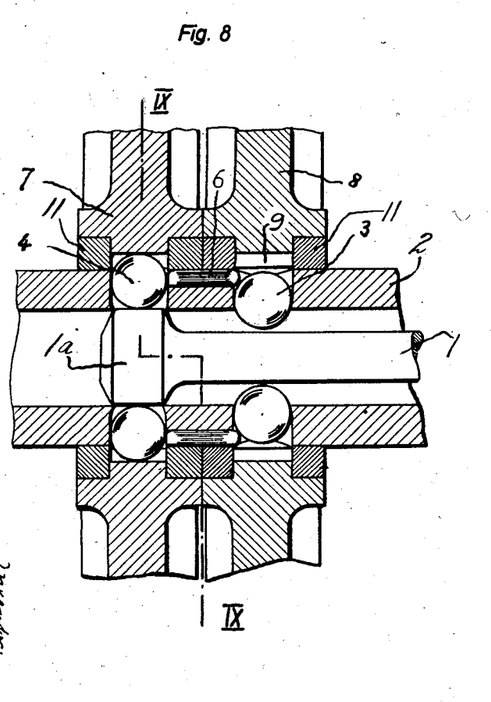
Fig. 8 is a longitudinal, fragmentary, sectional elevational view of an embodiment of a transmission according to the present invention, the structure of Fig. 8 being shown on an enlarged scale to illustrate the details thereof.
Figure 9:
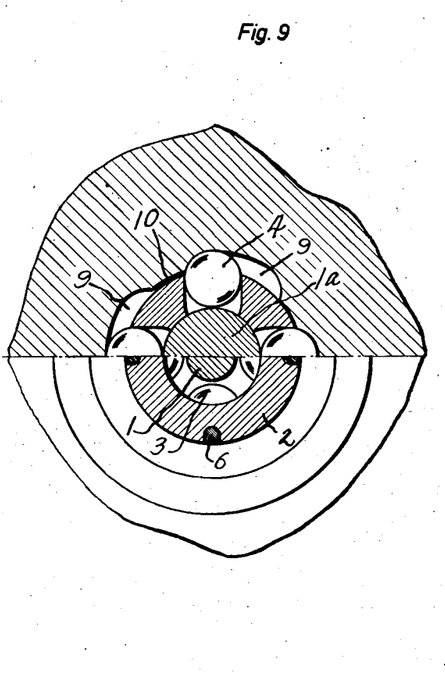
Fig. 9 is a transverse sectional elevational view taken along line IX—IX of Fig. 8.

In the embodiment of the invention which is illustrated in Figs. 8 and 9 the elongated pins 6 correspond to the pins 15 and are axially shiftable in the same way to produce the same results, although if desired a sleeve corresponding to the sleeve 5 may be used. As may be seen from Fig. 8, the gears 7 and 8 which respectively correspond to the elements 20 and 21 are freely turnable with respect to the shaft 2 and a plurality of bearings rings 11 support the gears 7 and 8 for free rotation on the shaft 2.

Each of the gears 7 and 8 is formed at its inner surface which is directed toward the shaft 2 with a plurality of recesses 9 distributed about the axis of the shaft 2 and respectively corresponding to the openings thereof wherein the motion transmitting elements are located, so that the latter elements are movable into the recesses 9 in order to place one or the other of the gears 7 or 8 in driving engagement with the shaft 2. In accordance with the present invention these recesses 9 have a particular configuration which is shown most clearly in Fig. 9. Thus, as may be seen from Fig. 9, each of the recesses 9 has a fairly long circumferential dimension with respect to the axis of the shaft 2, and in fact the circumferential length of each recess 9 is much longer than the corresponding dimension of the motion transmitting elements 3 or 4 which is located partly in the recess 9 in the manner shown at the upper portion of Fig. 9 when one of the gears is connected to the shaft 2 for rotation therewith. In fact, these recesses 9 are made so long that the portion 10 of the drive element which separates a pair of adjacent recesses 9 from each other has a circumferential length which is only great enough to guarantee that it is capable of reliably transmitting the necessary forces. Thus, the openings or recesses 9 are made as long as possible in the circumferential direction. It is possible to provide such a construction with the invention because the ball members are maintained against outward radial movement under centrifugal force by the means axially shiftable on the outer surface of the drive shaft 2, so that the ball members are not always pressing against the inner surface of the drive element which is not in driving engagement with the shaft 2. The construction shown in Fig. 9 is of particular advantage since at the instant when the bar 1 is actuated so as to move one or the other of the sets of motion transmitting elements outwardly toward its operating position, there is very little possibility that the portions 10 of the drive elements will be in alignment with the ball members, and so these ball members will move readily into the recesses 9 whose length is such that at practically all times a part of the recesses 9 are respectively circumferentially aligned with the ball members.

Figure 10:
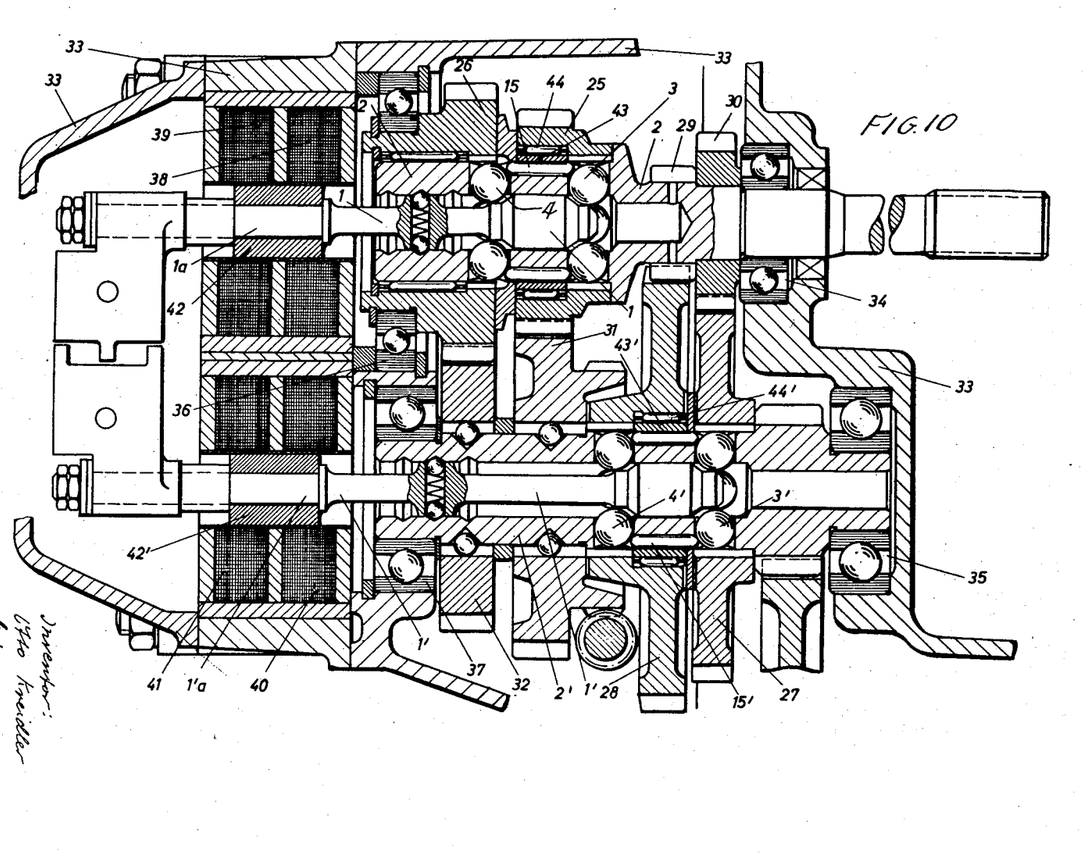
Fig. 10 is a longitudinal sectional elevational view showing an actual transmission which includes the structure of the invention.

Fig. 10 illustrates an actual transmission incorporating the structure of the invention. As may be seen from Fig. 10, a pair of elongated hollow shafts 2 and 2' are provided, and it is possible with the transmission of Fig. 10 to provide four different transmission ratios. The shaft 2 carries for free rotation a pair of gears 25 and 26 which may be selectively placed in driving engagement with the shaft 2 by the structure of the invention, and in addition the shaft 2 fixedly carries a pair of gears 29 and 30 which rotate with the shaft 2 at all times. The shaft 2' has freely turnable thereon a pair of gears 27 and 28 which may be selectively placed in driving engagement with the shaft 2' with the structure of the invention, while this shaft 2' fixedly carries a pair of gears 31 and 32 which are constrained at all times to rotate with the shaft 2'. The elongated hollow shaft 2 has the engaging bar 1 axially shiftable along its interior, while the elongated hollow shaft 2' has the engaging bar 1' axially shiftable along its interior. At the left portion of each shaft 2 or 2', as viewed in Fig. 10, is shown a spring-pressed ball and detent arrangement which serves to reliably locate each of the bars 1 and 1' in a predetermined, preselected position.

The drive is connected to the shaft 2, so that when this drive is an engine of an automobile, for example, the shaft 2 is driven directly from this engine, and a drive is taken off from the shaft 2', for example by the gear the upper portion of which is shown in the lower right of Fig. 10 in mesh with teeth formed directly on the shaft 2'.

The housing 33 which carries the transmission of Fig. 10 is made up of a plurality of interconnected parts, and this housing 33 carries suitable bearings such as ball bearings by which support the hollow shafts 2 and 2' for rotation about their axes, respectively. Thus, the bearings 34 and 36 rotatably support the shaft 2, while the bearings 35 and 37 rotatably support the shaft 2'.

The engaging means in the form of the bar 1 is surrounded at its left end portion, as viewed in Fig. 10, by a pair of electromagnet coils 38 and 39, and the left end portion of the bar 1' is surrounded by a pair of electromagnet coils 40 and 41. These coils are coaxial with the particular bar which they surround. The portion 1a of the bar 1 carries an armature 42, and the portion 1'a of the bar 1a carries an armature 42', these armatures being acted upon by the electromagnet coils so as to shift the bars 1 and 1' in desired directions. Suitable electrical connections are provided with the electromagnet coils so that it is possible for the operator to energize any one of the coils when the structure is in its neutral condition, and so that it is possible to energize any one of the coils when any other one of the coils is already energized. That is, if one of the coils is already energized, then it is possible to deenergize this latter coil and energize any other one of the coils.

The structure is shown in the neutral position in Fig. 10 where no drive will be transmitted from the shaft 2 to the shaft 2'. Each of the bars 1 and 1' has its outwardly extending annular portion capable of actuating one of two sets of ball members, as described above. The shaft 2 is formed with suitable openings in which the ball members 3 are located so that when the coil 38 is energized to shift the bar 1 to the right, as viewed in Fig. 10, the ball members 3 will be shifted radially away from the axis of the shaft 2 to place the gear 25 in driving engagement with the shaft 2. Also the shaft 2 has openings in which the ball members 4 are located, so that when the coil 39 is energized the shaft 1 will be shifted to the left, as viewed in Fig. 10, so as to place the gear 26 in driving engagement with the shaft 2. In the same way, the coil 40 may be energized to shift the shaft 1' to the right, as viewed in Fig. 10, so as to cause the ball members 3' to place the gear 27 in driving engagement with the shaft 2', or the coil 41 may be energized to shift the shaft 1' to the left, as viewed in Fig. 10, so as to place the gear 28 in driving engagement with the shaft 2', the balls 4' being moved outwardly to their operating position at this time. The shaft 2 is formed with axial grooves which accommodate the axially shiftable pins 15, and the shaft 2' is formed with axial grooves which accommodate the axially shiftable pins 15', these pins corresponding to and operating in the same way as described above.

The pins 15 are surrounded by a sleeve 43 which is freely turnable with respect to the shaft 2, and a suitable needle bearing 44 is provided between the sleeve 43 and the gear 25 to support the latter for free rotation. In the same way, a sleeve 43' surrounds the pins 15', and a suitable needle bearing 44' serves to suupport the gear 28 for free rotation.

When the coil 38 is energized, the transmission ratio is determined by the gears 25 and 31, and when the coil 39 is energized the transmission ratio is determined by the gears 26 and 32. When the coil 40 is energized the transmission ratio is determined by the gears 30 and 27, and when the coil 41 is energized the transmission ratio is determined by the gears 29 and 28.

The structure of the invention which protects against improper and faulty operation may advantageously be used in transmissions of all types where motion transmitting elements such as ball members are placed under centrifugal force.

It will be understood that each of the elements described above, or two or more together, may also find a useful application in other types of transmissions differing from the types described above.

While the invention has been illustrated and described as embodied in adjustable transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an adjustable transmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in driving engagement with said shaft; and means located on said shaft at the exterior thereof for free axial shifting with respect thereto, extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force.

2. In an adjustable tranmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respecspectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in driving engagement with said shaft; and means located on said shaft at the exterior thereof for free axial shifting with respect thereto, extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force, said means axially shiftable along the exterior of the shaft being in the form of a tubular sleeve surrounding the shaft at a portion thereof located between said planes and respectively having a pair of opposed end portions partly overlapping the two sets of motion transmitting elements when neither of the sets of elements is moved radially away from the shaft axis by said engaging means.

3. In an adjustable transmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in driving engagement with said shaft; and means located on said shaft at the exterior thereof for free axial shifting with respect thereto, extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force, said means axially shiftable along the exterior of the shaft being in the form of a tubular sleeve surrounding the shaft at a portion thereof located between said planes and respectively having a pair of opposed end portions partly overlapping the two sets of motion transmitting elements when neither of the sets of elements is moved radially away from the shaft axis by said engaging means, said sleeve being made of bearing material.

4. In an adjustable transmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in drivinng engagement with said shaft; and means located on said shaft at the exterior thereof for free axial shifting with respect thereto; extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force, said means axially shiftable along the exterior of the shaft being in the form of a tubular sleeve surrounding the shaft at a portion thereof located between said planes and respectively having a pair of opposed end portions partly overlapping the two sets of motion transmitting elements when neither of the sets of elements is moved radially away from the shaft axis by said engaging means, said sleeve being freely turnable on said shaft.

5. In an adjustable transmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in driving engagement with said shaft; means located on said shaft at the exterior thereof for free axial shifting with respect thereto, extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force, said means axially shiftable along the exterior of the shaft being in the form of a tubular sleeve surrounding the shaft at a portion thereof located between said planes and respectively having a pair of opposed end portions partly overlapping the two sets of motion transmitting elements when neither of the sets of elements is moved radially away from the shaft axis by said engaging means, said sleeve being freely turnable on said shaft; and a pair of bearings respectively mounting said drive elements on said shaft for free rotation with respect thereto, said shaft having a flangeless outer surface.

6. In an adjustable transmission, in combination, an elongated hollow shaft rotatable about its axis and being formed in each of a pair of axially spaced planes normal to said axis with a plurality of openings distributed about said axis; a pair of drive elements freely turnable on said shaft and respectively located in said planes, each of said drive elements having an inner surface surrounding and located adjacent said shaft and formed with a plurality of recesses distributed about the axis of the shaft, the recesses of said pair of drive elements being respectively located in said planes and respectively communicating with said openings of said shaft when said drive elements and shaft are in a predetermined angular position with respect to each other; a plurality of motion transmitting elements respectively located in said openings of said shaft and being radially movable therein to provide two sets of motion transmitting elements respectively located in said planes and respectively movable outwardly away from the axis of said shaft respectively into the recesses of said drive elements for placing the latter in driving engagement with said shaft and respectively toward the axis of said shaft for freeing each of the drive elements and said shaft for free rotation one with respect to the other; engaging means axially shiftable along the interior of said shaft for engaging a selected one of said sets of motion transmitting elements for moving the selected set of motion transmitting elements radially outward away from the axis of said shaft into the recesses of one of the drive elements for placing the latter in driving engagement with said shaft; and means located on said shaft at the exterior thereof for free axial shifting with respect thereto, extending between said planes, and having a neutral position partly overlapping the two sets of motion transmitting elements for maintaining the same inwardly away from their positions placing the driving elements in engagement with the shaft for rotation therewith, whereby when said engaging means is actuated to place one of the sets of motion transmitting elements in an operating position located in the recesses of one of the drive elements, the means shiftable along the exterior of the shaft will move the other of the sets of drive elements inwardly toward the axis of the shaft to prevent the other set of drive elements from moving outwardly under the action of centrifugal force, said shaft being formed at its outer surface between said planes with a plurality of axial grooves respectively aligned with said openings and said means shiftable along the outer surface of said shaft being in the form of a plurality of elongated pins respectively located in said grooves for axial shifting movement with respect to said shaft, each of said pins having a pair of opposite ends respectively partly overlapping a pair of motion transmitting elements respectively located in said plane for maintaining said motion transmitting elements inwardly away from their outer operating positions until said engaging means radially moves one of the sets of motion transmitting elements outwardly to its operating position.

7. In a transmission according to claim 1, said recesses of said drive elements respectively having circumferential lengths about the axis of said shaft greater than the corresponding lengths of said motion transmitting elements at the portions thereof which are respectively located in said recesses when said drive elements are connected by said motion transmitting elements to said shaft for rotation therewith.

8. In a transmission according to claim 1, said recesses of said drive elements respectively having circumferential lengths about the axis of said shaft greater than the corresponding lengths of said motion transmitting elements at the portions thereof which are respectively located in said recesses when said drive elements are connected by said motion transmitting elements to said shaft for rotation therewith, the recesses of each drive element being separated from each other by a plurality of portions each of which has a circumferential length only great enough to transmit the necessary driving force, so that said recesses are as long as possible in a circumferential direction with respect to said shaft.

9. In an adjustable transmission, in combination, an elongated hollow shaft rotatable about its axis and formed in each of a pair of axially spaced planes normal to said axis with a plurality of openings distributed about said axis; a pair of drive elements freely turnable on said shaft and respectively located in said planes, each of said drive elements having its inner surface directed toward said shaft formed with a plurality of recesses, and the recesses of said drive elements being respectively aligned with said openings of said shaft when said drive elements and shaft are in a predetermined angular position with respect to each other; a plurality of ball members respectively located in said openings of said shaft for radial movement outwardly away from the axis of said shaft to an operating position respectively located in said recesses of said drive elements for placing the latter in driving engagement with said shaft and inwardly toward the axis of said shaft to a non-operating position freeing said drive elements for free rotation with respect to said shaft; an elongated bar coaxial with said shaft and located in the interior thereof, said bar having an outwardly extending annular portion slidably engaging the inner surface of said shaft and cooperating with the ball members to place the ball members in a selected one of said planes in their operating position when the annular portion of said bar is located in said one plane; and means located at the exterior of said shaft between said planes and being axially shiftable with respect to said shaft in either direction from a neutral position where said means at the exterior of said shaft partly overlap the ball members in both of said planes for maintaining said ball members inwardly away from their operating positions, whereby when said bar is shifted to locate the ball members in one of the planes in their operating position, the means at the exterior of the shaft is automatically shifted by the ball members in said one plane toward the other plane to automatically move the ball members in the other plane inwardly toward the axis of the shaft so as to maintain the ball members in said other plane in their non-operating position.

References Cited in the file of this patent

UNITED STATES PATENTS

| | | |
|---|---|---|
| 1,102,427 | Morgan | July 7, 1914 |
| 1,241,924 | Cole | Oct. 2, 1917 |

FOREIGN PATENTS

| | | |
|---|---|---|
| 252,829 | Italy | Apr. 16, 1927 |
| 473,208 | Great Britain | Oct. 8, 1937 |